Nov. 9, 1954     H. E. ZAHN     2,694,099
LEAD-ACID BATTERY GRID
Filed Nov. 21, 1952

INVENTOR.
HAROLD E. ZAHN
BY
Beau, Brooks, Buckley & Beau.
ATTORNEYS.

United States Patent Office

2,694,099
Patented Nov. 9, 1954

2,694,099

LEAD-ACID BATTERY GRID

Harold E. Zahn, Buffalo, N. Y., assignor to Gould-National Batteries, Inc., St. Paul, Minn.

Application November 21, 1952, Serial No. 321,765

8 Claims. (Cl. 136—58)

This invention relates to electric cell electrodes, and more particularly to improved active material containers in primary or secondary batteries. Furthermore, the invention relates particularly to improvements in such structures designed primarily to reduce the weight thereof.

Whereas, for some time it has been evident that production of a successful light weight battery is highly desirable, for use for example for military purposes, efforts to date in this respect have not proved completely satisfactory. It is of course well known that pure lead and/or certain alloys thereof are sufficiently resistant to sulphuric acid and otherwise suitable as to indicate such materials to be the most practicable for lead-acid storage battery grid construction purposes. However, such materials are so heavy that it is practically prohibitive to use solid lead or lead alloys in the construction of such grids where light weight is essential; and similarly in alkaline batteries the use of solid nickel and iron for the grids, or nickel and cadmium, is highly disadvantageous from the weight standpoint. It has been suggested to fabricate such grids compositely so as to comprise inner cores of relatively light weight material coated with outer sheaths of metal to provide the requisite electrical conductivity and electrolyte resistance throughout the surface areas in contact with the battery electrolyte.

Thus, for example, as suggested in U. S. Patent 1,509,186 certain non-metallic sheets of relatively light weight material have been punched into the desired grid form and then given lead coatings by spraying molten metal upon the grid structure, and/or by electrical deposition of lead coatings upon such core supports. However, such prior art suggestions have been unproductive of the desired results. In the case of the lead spraying system the product has been found to be too irregular and/or relatively porous at the acid contact surfaces and thereby too fragile to provide the requisite degree of reliability. In the case of prior art electro-deposition methods employing a non-metallic base material and intermediate conductive coatings of graphite or the like, it has been found that the electro-plated sheaf of lead or lead alloy is quite thin and relatively fragile and is relatively insecurely attached to the core structure to be practicable. To avoid the aforesaid difficulties it has also been proposed to electro-plate the lead coating upon a light weight conductive core material such as a suitable aluminum alloy; but such efforts have failed to produce uniformly satisfactory products because of the practical impossibility of obtaining an electro-plated lead coating of uniform thickness free from zones of weakness such as are penetrated by the battery acid so that the latter thereby gains access to the aluminum or other metallic core structure and thereupon proceeds to leach out the latter at rapid rate resulting in undercutting of the lead coating and complete disintegration of the plate structure.

Whereas, the problem of production of an improved light weight grid for use in alkaline batteries is treated in my co-filed patent application, it is the object of the present invention to provide an improved battery grid structure for lead-acid batteries avoiding the various difficulties and disadvantages referred to hereinabove.

Another object of the invention is to provide an improved light weight battery electrode for use in light weight lead-acid batteries, such as may be economically produced by modern large scale production shop processes.

Another object of the invention is to provide an improved cell grid structure as aforesaid which will be of increased useful longevity.

Still another object of the invention is to provide in a composite cell grid of the type referred to improved electrical conductivity characteristics.

Other objects and advantages of the invention will appear from the specification hereinafter.

Figure 1:
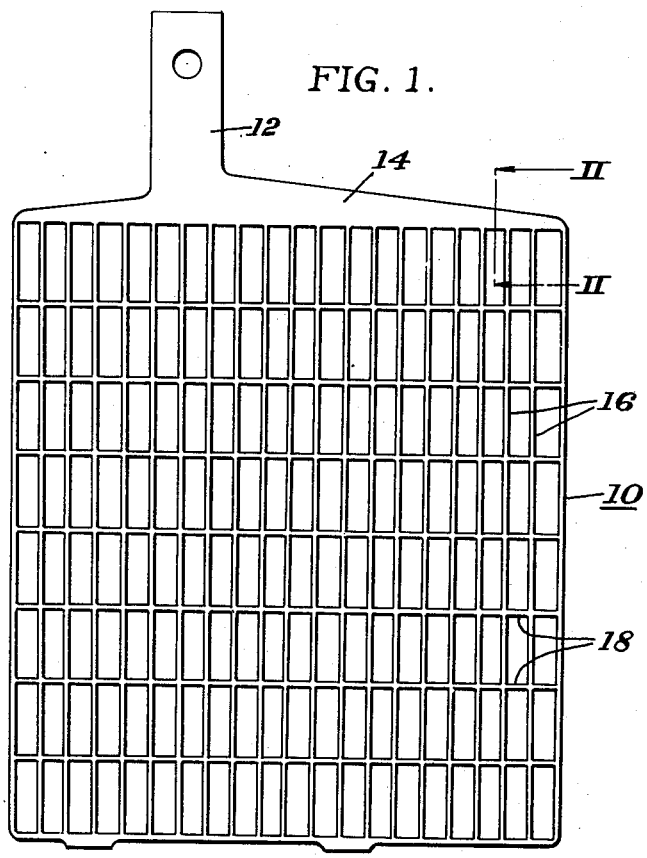
Fig. 1 is a front elevational view of the core portion of a lead-acid battery grid of the present invention.

The present invention contemplates a battery cell plate grid for lead-acid type batteries comprising a novel composite structure consisting of a relatively light weight "core" element which is also highly resistant to battery acid; a sub-coating of relatively high conductivity metal covering the grid "core" element; and an outer coating of lead or lead alloy so deposited over the sub-coating as to provide the active paste contacting portions of the grid structure. More specifically, the outer lead or lead alloy coating is so distributed over the sub-coating so as to provide thereover a uniformly dense and acid-resistant "armor"; but it is a particular feature of the present invention that in event the battery acid happens to work through the lead coating portion of the grid it simply "dead-ends" against the acid resistant plastic core material, whereby undermining of the metallic coating portions of the structure and disintegration thereof are avoided.

For example, as shown in the drawing, a grid structure of the invention may be fabricated by initially injection-molding or striking out of a sheet of suitable plastic material a grid "core" structure as indicated generally at 10, as by any suitable molding or stamping or die cutting process; or the like such as would be obvious to anyone skilled in the art. The material from which the grid structure 10 is formed may comprise any suitable acid-resistant and relatively light weight plastic material such as selected for example from the polystyrene group; or the polyethylene group; and in either case the plastic material may be of either the electrically conductive or nonconductive type. In this respect references made to the fact that whereas plastic materials are ordinarily electrically nonconductive, they may be manufactured to include graphitic or metallic fillers or the like so as to render them electrically conductive; and one specific example of such a material that is suitable for this purpose is presently commercially available under the trade name "Markite." It is to be understood that in event a plastic material of the so-called "conductive" type is employed, the core structure per se will contribute to the overall electrical conductivity of the finished product which includes the relatively highly conductive metallic sub-coating layer under the corrosion-resistant outside material layer.

Figure 2:
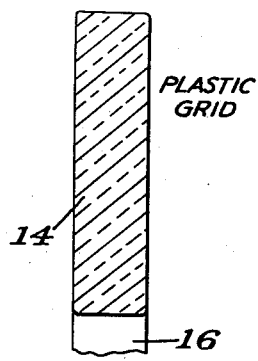
Fig. 2 is a fragmentary section, on an enlarged scale, of the core construction of Fig. 1, taken along line II—II of Fig. 1.

In any case the grid 10 will be so thickness dimensioned as to allow for subsequent coating thereof, as will be explained hereinafter, to provide the overall desired thickness of the finished grid structure. It will of course be understood that the grid core structure 10 may be of any preferred profile configuration, and will be designed so as to provide the active paste carrying pocket formations of the desired shape and dimensions, as is customary in the art. Thus, for example as shown in the drawing, the grid core structure may include a terminal portion 12; a top bus bar portion 14; vertical ribs 16; and horizontal ribs 18; the vertical and horizontal rib formations cooperating to provide the active paste receiving pocket portions of the grid, as is well known in the art. Thus, a fragmentary sectional view of the grid core structure will appear as illustrated at Fig. 2 in the drawing.

Figures 3, 4:
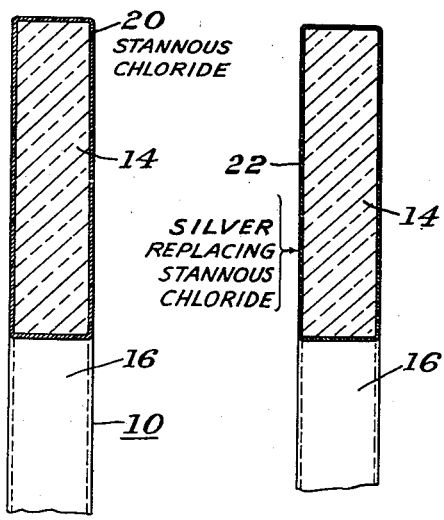
Fig. 3 is a view corresponding to Fig. 2, but subsequent to application thereto of an intermediate coating.
Fig. 4 is a view corresponding to Fig. 3, but illustrating a subsequent replacement coating thereon.
Figure 5:
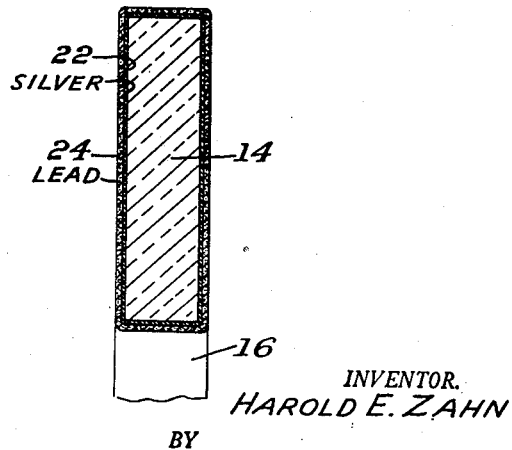
Fig. 5 is a similar view showing application over the structure of Fig. 4 of a final lead coating, thereby illustrating a typical sectional view through any portion of the finished grid structure.

The invention involves placement of an undercoating of relatively high conductivity metal on the plastic core; such as an undercoating of tin or copper or silver. If an undercoat of silver is desired the next step in the process of the invention may involve temporarily wetting the plastic core structure with a water solution of stannous chloride, as by a dipping or spraying operation so that the plastic core piece is thoroughly wetted with the stannous chloride solution, as indicated at 20, Fig. 3. Then the next step in the process of the invention is to procure a replacement of the tin elements of the core coating with silver so as to provide an undercoat of pure silver over the plastic core structure, as indicated at 22 in Fig. 4. This replacement of the tin by silver may be accomplished either by dipping the stannous chloride wetted core piece in a water solution of silver nitrate, or by first coating the core piece with graphite and then submerging it in a silver electro-plating bath. In either case the objective is to replace the tin by a pure silver coating of the order of $5/10{,}000$ of an inch thick. Then as the third step of the process of the invention the silver plated core piece is transferred to a lead plating bath whereupon a lead or lead alloy coating as indicated at 24 (Fig. 5) is applied over the silver undercoat 22. In the event that an electrically conducting plastic of the type above mentioned is used for the plastic core the high conductivity metal undercoating might be placed thereon by direct electrodeposit without prior conditioning, as by stannous chloride; or if functional life and capacity demands permit, the undercoating might be eliminated entirely and the lead coating would then be directly applied to the plastic core piece.

The grid structure is then prepared for reception of active paste material in the pockets thereof, as is well known in the art; and it will of course be appreciated that when the grid is "pasted" the active paste material will come in direct contact only with the outer lead coating 24 and that the battery acid will have access only to the outer lead coating. At the same time, it will be appreciated that whereas the conductivity of the lead coating is rather low, the battery currents will flow readily through the lead coating and into the silver undercoating and thence toward the grid terminal with greatly improved facility compared to a correspondingly dimensioned grid structure of the prior art. At the same time, due to the fact that the core element of the grid structure is of light weight plastic material, the overall weight of the grid structure is greatly reduced compared to correspondingly dimensioned grids of the prior art.

Thus, the combination lead and silver coating structure of the grid member provides improved conductivity characteristics compared to a solid lead structure of equal sectional thickness without being excessively expensive from the standpoint of cost and materials and/or fabrication; and furthermore the relatively fragile low tensile strength lead material of the outer coating of the grid structure of the present invention is thereby structurally bonded to the relatively stronger silver undercoat and thereby to the extremely tough plastic core element of the structure, thereby providing a novel composite grid structure which is of greatly improved overall strength and resistance against physical disrupture due to vibration or shock. In this respect it will be appreciated that the composite novel grid structure of the present invention possesses an overall physical strength greatly superior to that of a solid lead grid for example, which is notoriously weak and subject to physical failure under vibration or shock, as well as being excessively heavy and therefore impracticable for certain uses.

It is another particular feature and advantage of the grid structure of the present invention that in event of any imperfection in the lead outer coating portion 24 thereof, whereby battery acid simply reaches a "dead-end" because the silver layer undercoat is too thin to permit undercutting by the battery acid between the lead outer coat and the plastic core, and because the plastic core element is completely acid-resistant. Consequently, undercutting of the lead outer coat is effectively forestalled and introduces no problem of grid disintegration such as has been experienced in attempts to provide a lead coated aluminum core type grid, or the like. Thus, it will be appreciated that a relatively thin layer of lead material provides, in the case of the present invention, a perfectly adequate armor against the battery acid; whereby an extremely light weight yet adequately armored grid is provided. Also, it will be appreciated that the composite grid structure of the present invention is of reduced resistance to electrical current flow, for any given lead sectional thickness; and because of the superior conductivity characteristics of the composite grid structure of the invention a maximum volume of active material may be supported in a minimum volume of support frame.

Whereas the invention has been described in detail hereinabove in connection with a lead-acid storage battery grid construction wherein the undercoat is formed of silver deposited on the core structure through replacement of a temporary tin salt coating; it is to be understood that the invention may be practiced in various modified forms. For example, in lieu of the use of a stannous chloride dipping method as explained hereinabove, the initial tin coating may be supplied by direct vapor deposition of pure tin on the plastic core structure, or by electro-plating the tin thereon. Also, it is to be understood that in lieu of the silver undercoat as described in detail hereinabove, a satisfactory permanent undercoat material may comprise either tin or copper; and that in any case the undercoating metal may be plated over the plastic core structure by any suitable method such as vapor deposition or electro-plating or some suitable chemical replacement process. In any case the relatively high conductivity undercoat metal will be subsequently outer-coated with lead or lead alloy, as explained hereinabove, so as to provide suitable acid insulation of the relatively high conductivity undercoat metal.

Thus, it will be appreciated that although only a few forms of the invention have been illustrated and described in detail, it will be apparent to those skilled in the art that the invention is not so limited but that various changes may be made therein without departing from the spirit of the invention or the scope of the appended claims.

I claim:

1. In a battery, a grid comprising a core formed of an acid-resistant plastic material having a first coat of high electrical conductivity metal thereon and an overcoat of lead thereon.

2. In a battery, a grid including a core formed of an acid-resistant plastic material undercoated with electrically high conductivity metal and overcoated with lead, the pocket formations of said grid being filled with battery active paste material.

3. In a battery, a cell plate having a terminal and comprising a core formed of an acid-resistant electrically-conductive plastic material having bonded thereon a relatively thin lead coating, said plate having an electrically conductive path from said coating to said terminal, said path comprising said plastic material.

4. An improved lead-acid battery grid construction, comprising a compositely formed grid including a core piece of grid configuration formed of an acid-resistant plastic material, said grid having thereon a sub-coating of relatively high electrical conductivity metal and an outer coating of relatively lower electrical conductivity but acid-resistant metal, whereby corrosive action of the battery electrolyte against said battery grid construction is substantially forestalled.

5. A battery cell plate grid compositely formed from a core of acid-resistant plastic material pocketed to receive battery active paste material therein, said grid being uniformly coated with two bonded metallic layers, the undercoat layer being of a relatively high electrical conductivity metal selected from the class of metals including silver, tin and copper, and the outercoat layer being of an acid-resistant metal such as lead or lead alloy.

6. An improved lead-acid battery grid construction, comprising a compositely formed grid including a core piece of grid configuration formed of an acid-resistant plastic material, said grid having thereon a sub-coating of silver in the order of $5/10{,}000$ of an inch thick and an outer coating of relatively lower electrical conductivity but acid-resistant metal, whereby corrosive action of the battery electrolyte against said battery grid construction is substantially forestalled.

7. A method of making an electrically conductive and acid-resistant battery cell plate grid by forming a plastic material into cell-plate grid shape, coating said plastic with a water solution of stannous chloride and then reacting said stannous chloride with a water solution of silver nitrate whereby the said plastic material receives a bonded coating of silver in the order of $5/10,000$ of an inch thick and subsequently overcoating said silver coating by a layer of metal selected from the group including lead and lead alloys by means of electroplating.

8. A method of making an electrically conductive and acid-resistant battery cell plate grid by forming a plastic material selected from the group including polystyrene and polyethylene plastics into cell-plate grid shape, coating said plastic with a water solution of stannous chloride and then reacting said stannous chloride with a water solution of silver nitrate whereby the said plastic material receives a bonded coating of silver in the order of $5/10,000$ of an inch thick and subsequently overcoating said silver coating by a layer of lead by means of electroplating.

References Cited in the file of this patent

UNITED STATES PATENTS

| Number | Name | Date |
| --- | --- | --- |
| 1,639,280 | Benner et al. | Aug. 16, 1927 |
| 2,190,121 | Misciatelli | Feb. 13, 1940 |